Figure 1:
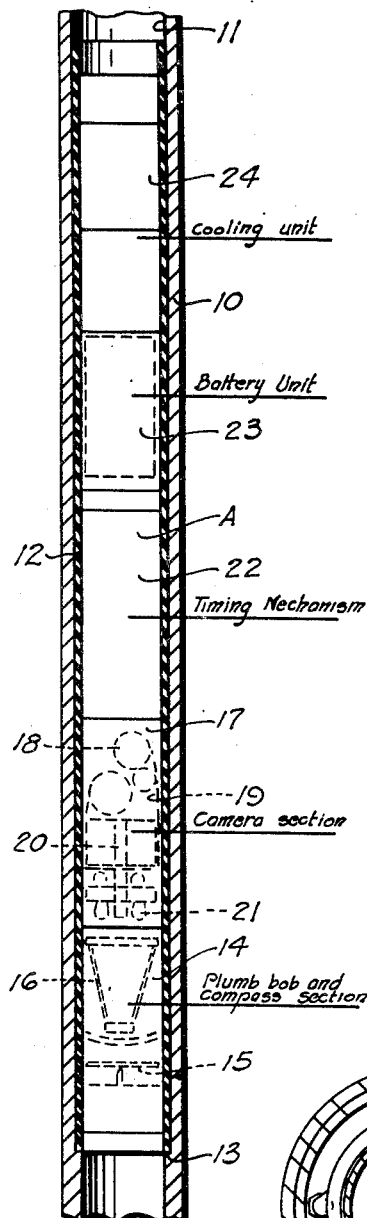

Sept. 5, 1950             G. JACKSON             2,521,294

WELL SURVEY APPARATUS

Filed Sept. 25, 1944                            2 Sheets—Sheet 1

Gordon Jackson
INVENTOR.

BY Jod E. Edwards
ATTORNEY.

Sept. 5, 1950            G. JACKSON            2,521,294
WELL SURVEY APPARATUS
Filed Sept. 25, 1944            2 Sheets-Sheet 2
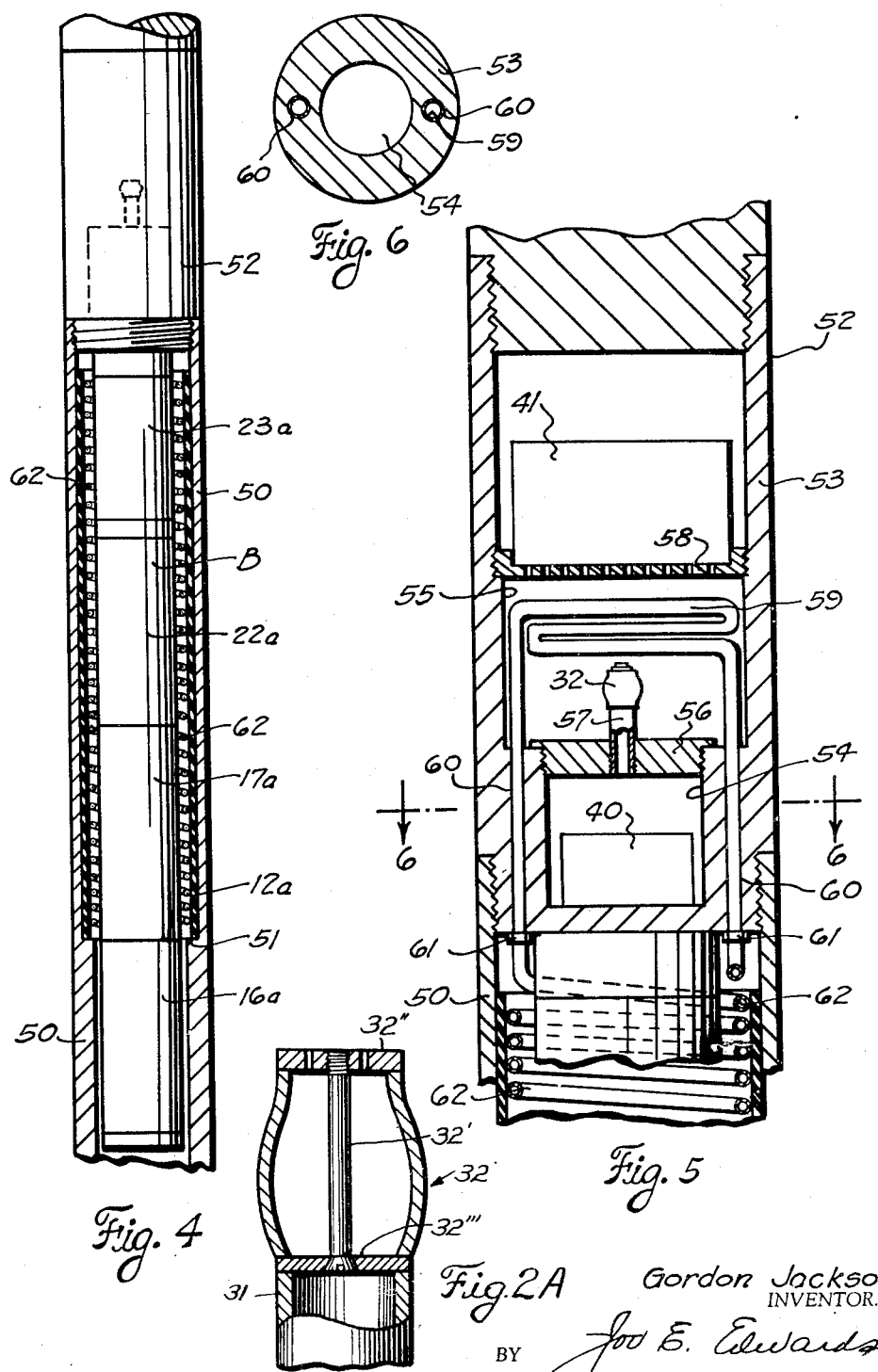
Gordon Jackson
INVENTOR.
BY Joe E. Edwards
ATTORNEY.

Patented Sept. 5, 1950

2,521,294

UNITED STATES PATENT OFFICE 2,521,294

WELL SURVEY APPARATUS

Gordon Jackson, Long Beach, Calif., assignor, by direct and mesne assignments, to Eastman Oil Well Survey Company, Dallas, Tex., and Denver, Colo., a corporation of Delaware Application September 25, 1944, Serial No. 555,618

10 Claims. (Cl. 62—91.5)

This invention relates to new and useful improvements in well survey apparatus.

As petroleum wells are drilled to deeper depths to recover production at lower levels the sub-surface temperatures which are encountered progressively increase with the result that the apparatus and equipment used in these deeper drilling operations are subjected to the higher sub-surface temperatures. The present instruments and apparatus which are employed to survey well bores to ascertain the direction and degree of inclination of said bores ordinarily include a photographic film for recording the position of the direction and deviation indicators of said devices; also, many of these instruments utilize dry cell batteries as the power source and it has been found that said batteries, as well as the photographic film, are adversely affected by extremely high temperatures such as are encountered in deeper wells. Some attempts have been made to protect the instruments from excessive heat by means of insulation but such insulation is not of itself, a complete solution of the problem. Insulation in sufficient thickness will retard the rate of heat transfer but because heat energy is accumulative, insulation will only delay the ultimate destruction of the film and batteries of the instrument. For this reason, under the extremely high temperatures present in deep wells insulation alone is not effective as a protection for the instrument.

It is, therefore, one object of the present invention to provide an improved well survey apparatus which is so constructed that the elements thereof are protected against damage by excessive heat occasioned by the extremely high temperatures encountered in the sub-surface formation.

An important object of the invention is to provide an improved well survey apparatus having a refrigeration means incorporated therein and forming part of the apparatus, said means functioning to cool the apparatus and thereby protect the same from damage caused by high sub-surface temperatures.

A particular object of the invention is to provide an improved apparatus of the character described wherein the refrigerating unit may form part of the well survey instrument or if desired may form part of the outer barrel which receives said instrument; in either case, said unit being arranged to cool the instrument to protect the same from excessive sub-surface temperatures, whereby the photographic film, batteries and other parts of the survey instruments may function efficiently at all times.

Another object of the invention is to provide an improved refrigerating unit for well survey instruments which utilizes the cooling effect resulting from the evaporation or sublimation of a solidified gas to cool a circulating liquid, which liquid is circulated in such manner as to remove the heat passing to the instrument and thereby maintain said instrument at a cool temperature; the gas being absorbed at low pressure by a suitable mixture which is disposed within the refrigerating unit, whereby said gas will be efficiently disposed of within the unit.

Still another object of the invention is to provide an improved refrigerating unit which is self-contained and which utilizes carbon dioxide in its solidified form, or "dry ice" as it is known commercially as the cooling agent; the cooling being transferred to the instrument by any suitable means such as cooling coils or by direct metallic contact. The unit also including an absorption medium, such as sodium hydroxide or other compound for absorbing the carbon dioxide as it evaporates or "sublimes" during the cooling process.

The construction designed to carry out the invention will be hereinafter described together with other features of the invention.

Figure 2:
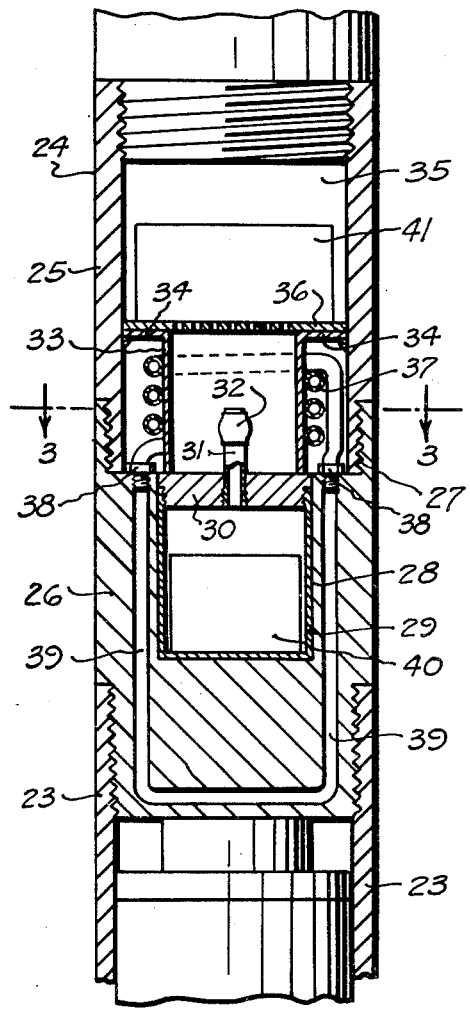
Figure 3:
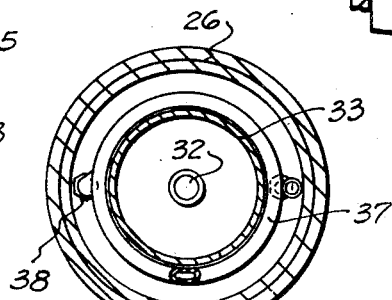

The invention will be more readily understood from a reading of the following specification and by reference to the accompanying drawing, wherein an example of the invention is shown, and wherein:

Figure 1 is a view partly in elevation and partly in section of an improved well survey apparatus constructed in accordance with the invention, Figure 2 is an enlarged transverse vertical sectional view of the refrigerating unit, Figure 2A is an enlarged sectional view showing details of the thermostatically controlled valve, Figure 3 is a horizontal cross-sectional view taken on the line 3—3 of Figure 2, Figure 4 is a view partly in section and partly in elevation and illustrating a modified form of the invention, Figure 5 is an enlarged transverse vertical sectional view of the refrigerating unit shown in Figure 4, and, Figure 6 is a reduced horizontal cross-sectional view taken on the line 6—6 of Figure 5.

In the drawings the numeral 10 designates an outer casing or barrel which is formed with an axial bore 11 extending entirely therethrough. The casing or barrel is adapted to receive the well survey instrument A and a tubular insulating sleeve 12 surrounds the instrument, being interposed between said instrument and the wall of the barrel. An internal annular shoulder 13 may be formed within the barrel for supporting the insulating sleeve. The instrument A is inserted in the barrel which has its ends (not shown) closed by suitable closures or plugs in the usual manner and in many instances a shock absorbing means which also has been omitted is disposed between the ends of the instrument A and the extremities of the barrel.

The instrument A which is shown in Figure 1 is illustrated as a multiple shot well surveying instrument and is of the usual construction which is now in general use in the oil industry. The instrument includes a lower section 14 which houses a compass 15 and plumb bob 16. A camera section 17 is connected to the section 14 and includes the usual film rolls 18, film 19, lens 20 and lights 21. In operation the plumb bob 16 and compass 14 are photographed on the film 19 to obtain the necessary record. A timing mechanism (not shown) is housed within a section 22 which is connected above the camera section 17 while the batteries which furnish the source of current supply are mounted within a battery section 23. All of these sections are connected to each other, usually by threaded connection, and together form the entire instrument A and the walls of the various sections which are metal tubes form a tubular shell or casing for the operating parts of the instrument.

As explained, the instrument A is arranged to be lowered within the well bore so that a record of the deviation and direction of such deviation may be made throughout the length of said bore. As wells are drilled to deeper depths the sub-surface temperature increases and manifestly the various elements which make up the instrument A are subjected to these higher sub-surface temperatures. The photographic film 19 as well as the batteries within the section 23 are more liable to damage by these higher temperatures and it is desirable that these elements particularly be protected against such temperatures.

In carrying out the present invention a refrigerating or cooling unit 24 is adapted to be connected to the battery section 23 of the instrument and when so connected the section 24 forms the upper portion of the instrument A. As is clearly shown in Figure 2 the section 24 forms a housing which includes an upper tubular member 25 and a lower body member 26 which parts are connected together by threads 27. The body 26 has its lower end threaded into the battery section 23 and is formed with an internal chamber or recess 28 which is located in its upper portion. A container 29 is adapted to fit within the recess or chamber 28 and this container has its open upper end closed by a suitable closure or cover 30. A pipe 31 extends upwardly through the cover 30 and is suitably secured within said cover axially thereof. A thermostatically controlled pressure valve 32 shown in detail in Figure 2A is mounted on the upper end of the pipe 31 and this valve, as will be explained, is arranged to release the pressure from the interior of the container 29. The upper portion of the pipe 31 and the valve 32 are disposed within the lower end of the tubular member 25 of the refrigerating unit. As shown in Figure 2A the valve 32 has a valve element 32' of expandable metal secured at its upper end to the perforated top plate 32" of the valve casing. The lower end of the valve element controls an outlet orifice 32''' in the bottom wall of the valve casing. The valve element normally closes the outlet orifice, but when subjected to a temperature greater than a predetermined value, the valve element will have such longitudinal expansion that the orifice will be opened.

A metallic shell 33 is disposed axially within the member 25 and this shell surrounds the pipe and valve. An outwardly directed annular flange 34 is formed on the shell and has its peripheral edge suitably secured to the inner wall of the member 25 whereby said shell forms a part of said member. The interior of the member 25 forms an absorption chamber 35 and a perforated plate 36 spans this chamber, being supported upon the flange 34 of the shell 33.

A circulating coil 37 surrounds the shell 33 and is arranged to receive a suitable liquid refrigerant such as a brine solution. The ends of the coil are connected by couplings 38 with a U-shaped circulating passage 39 which is formed in the body 26 of the refrigerating unit. Thus the liquid refrigerant may circulate through the passage 39 and coils 37 in a continuous flow.

For effecting cooling of the liquid refrigerant, a suitable refrigerating medium 40 is disposed within the container 29 and it has been found that carbon dioxide in its solidified form, which is known commercially as "dry ice" produces satisfactory results. Carbon dioxide has been found suitable because the critical temperature thereof is high enough to permit control of the boiling rate without the necessity of handling exceedingly high pressures. The control valve 32 is set so that a predetermined pressure may build up within the container 29, such pressure being produced by the evaporation or boiling of the carbon dioxide. When the temperature in the chamber 35 rises to a predetermined point, the valve 32 is automatically opened by the longitudinal expansion of the valve element 32'. This opening of the valve 32 will result in a release of the pressure from the container 29 and the sudden expansion into the chamber 35 will produce a cooling effect which will cool the liquid circulating through the coils 37. As the liquid is cooled in the coils 37 it circulates downwardly through the passage 39, and through the metal to metal contact between the unit 24 and battery section 23, the metallic casing of the instrument A will be cooled.

The gas which is released into the chamber 35 when the valve 32 is opened is absorbed by a suitable compound 41 which is supported upon the perforated plate 36. This compound may be any compound which is capable of absorbing a large volume of carbon dioxide at low pressures. It has been found that sodium hydroxide is a suitable compound since it requires only approximately two pounds of the same to absorb one pound of carbon dioxide gas. Another compound which would be satisfactory is one produced by the United States Bureau of Mines and known by the trade name of "Cardoxide." Cardoxide consists of a packed mixture of caustic soda and lime crushed into the granular form and screened. This compound always remains dry, is easy to handle and is probably more active than sodium hydroxide. It is particularly noted that the invention is not to be restricted to any particular compound and so long as the compound is capable of absorbing the particular gas which is released into the chamber 35, the purposes of the invention will be accomplished.

The cooling unit 24 is connected directly to the upper portion of the instrument A and becomes an integral part of said instrument. By proper calibration or adjustment of the thermostatically controlled pressure valve 32, the cooling of the coils may be carried out under the proper temperature conditions. It is evident that the valve 32 will control and regulate the rate of sublimation of the carbon dioxide 40 within the container. The liquid refrigerant will circulate through the coils 37 and the passage 39 and will effectively cool the instrument casing throughout its entire length. The insulating sleeve 12 which is interposed between the outer barrel 10 and the instrument proper will aid in maintaining the instrument cool since it will prevent the heat from the exterior passing to the instrument and will at the same time prevent the cold transmitted to the instrument from being rapidly dissipated within the well bore. One of the features of the invention is the construction of the cooling unit which is self contained and which may or may not be used as desired. Thus the unit is more or less of an attachment which may be connected to the instrument when high subsurface temperatures are to be encountered and which may be omitted when the instrument is to be used in a shallow well having lower temperatures. In operation of the refrigerating system heat will accumulate in the chamber 35 and when this reaches a temperature greater than the fluid surrounding the tubular wall 25 it will be rapidly dissipated through the wall to the fluid as no insulation is associated with the wall. The chamber 35 is above the parts being cooled and, even when the temperature becomes high in the chamber, the instrument will be maintained at a sufficiently lower temperature that damage will be prevented. By circulating fluid in the well bore between operations of the instrument will also aid in dissipating heat from the chamber 35.

In some instances or with certain types of instruments it may not be desirable to connect the cooling unit directly to the instrument itself and in such case the invention may take the form shown in Figures 4 to 6. As shown in Figure 4 a well survey instrument B is mounted within an outer casing or barrel 50. The instrument may include a plumb bob and compass sections 16a, a camera section 17a, a timing section 22a and a battery section 23a. An insulating sleeve 12a is mounted within the barrel 50, being supported upon an internal annular shoulder 51.

In this form instead of connecting the cooling unit directly to the upper portion of the instrument, a cooling unit 52 is arranged to be connected to the upper end of the barrel 50. As shown in Figure 6 the unit 52 includes a housing 53 which has a chamber 54 formed in its lower end. The upper portion of the housing is tubular being provided with an axial bore 55. The chamber 54 is arranged to receive the carbon dioxide 40 and has its upper end closed by a cover 56 having an outlet pipe 57 disposed axially therein. The thermostatically controlled pressure valve 32 is mounted on the pipe 57 and is arranged to release gas from the chamber 54 into the upper tubular portion of the housing. A transverse perforated plate 58 is mounted within the housing 53 and supports the absorption compound 41. A coil 59 is mounted within the housing immediately above the valve 32 and has its end portions extending downwardly through passages 60 formed in the lower end of the housing on each side of the chamber 54. The ends of the coil 59 are adapted to be connected by couplings 61 with a refrigerating coil 62 which is mounted within the bore of the barrel 50. As is clearly shown in Figure 4 the coil 62 extends substantially throughout the length of the insulating sleeve 12a and thereby surrounds the major portion of the instrument B.

The operation of this form of the invention is exactly the same as the first form hereinbefore described. The evaporation or subliming of the carbon dioxide builds up a pressure within the chamber 54. When the temperature within the upper portion of the housing and adjacent the coils 59 rises to a predetermined point the valve 42 is automatically opened to release the pressure within the chamber 54. The sudden expansion of the released gas results in a cooling of the liquid refrigerant within the coil 59 and this cool refrigerant is then circulated downwardly through the cooling coil 62 which surrounds the instrument. This liquid refrigerant acts to cool the instrument B and thereby protect the parts of said instrument from damage by excessive heat. The gas which is released through the valve 32 rises upwardly in the housing 53 and is absorbed by the compound 41 which is supported on the transverse plate 58. Manifestly the operation repeats itself and constantly maintains the refrigerant sufficiently cool to properly cool the instrument B.

In the second form of the invention the cooling unit is self-contained and is connected directly to the outer barrel 50 which houses the instrument. Just as in the first form, the unit may be readily omitted when the instrument is to be run in a shallow well having lower temperatures which would not be detrimental to the efficient operation of the instrument.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A refrigerating unit for a well survey instrument assembly, said unit comprising, a tubular housing having a pressure chamber for receiving a solidified cooling medium, said housing also having an expansion chamber adjacent the pressure chamber with an opening establishing communication between said chambers, a thermostatically controlled valve means associated with the opening for controlling the admission of gas which is produced by evaporation of the solidified cooling medium from the pressure chamber to the expansion chamber, whereby the release of said gas into the expansion chamber produces a cooling effect, said thermostatically controlled valve means being operated in accordance with the temperature in the expansion chamber, cooling coils having a liquid refrigerant therein mounted in the housing adjacent the expansion chamber, whereby the refrigerant is cooled by the cooling effect created in said expansion chamber, and means for attaching the housing to the well survey instrument assembly whereby the cooling coils may function to cool the survey instrument.

2. A refrigerating unit as set forth in claim 1, wherein the cooling medium in the pressure chamber is a solidified gas such as carbon dioxide, together with an absorbing compound within the expansion chamber capable of absorbing the gas released into said expansion chamber.

3. A refrigerating apparatus for cooling a well survey instrument assembly comprising, a housing having a pressure chamber therein for containing a solidified cooling medium which will upon sublimation produce a gas under pressure within the chamber, an expansion chamber within the housing, means for establishing communication between said pressure chamber and said expansion chamber, control means for controlling the admission of gas from the pressure chamber to the expansion chamber to thereby control the cooling effect in the latter, cooling coils having a liquid refrigerant therein positioned within the housing so that the cooling effect produced in said expansion chamber cools said coils, and means connected with the coils and disposed adjacent the well survey instrument assembly for utilizing said coils to cool said survey instrument.

4. A refrigerating apparatus for cooling a well survey instrument enclosed in a metal tubular structure which is mounted within an outer barrel, said apparatus including, a metal housing which is connected to the upper portion of the instrument enclosure structure so as to form an extension of the instrument and also whereby a metal to metal contact between said instrument and housing is obtained, cooling coils within the housing having a liquid refrigerant circulating therethrough, and means also within the housing for cooling the refrigerant circulating through the coils, whereby said coils function to cool the instrument by conduction through the metal to metal contact between the housing and the enclosure structure of the instrument.

5. A refrigerating apparatus as set forth in claim 4, wherein the means for cooling the refrigerant comprises carbon dioxide confined within a chamber in said housing, together with temperature-controlled means for releasing the gas under pressure built up by the sublimation of said carbon dioxide to produce a cooling effect at the point of release within said housing.

6. A refrigerating apparatus for cooling a well survey instrument which is mounted within an outer casing, said apparatus including, cooling coils adapted to be disposed within the casing in a position surrounding said instrument, a housing connected to the upper portion of the casing and forming a continuation thereof, a cooling coil within said housing and connected with the cooling coils within the casing, whereby a liquid refrigerant may be circulated through said coils, and means within the housing for cooling the refrigerant whereby the instrument is cooled by the circulation of the refrigerant through the coils surrounding the instrument.

7. A refrigerating apparatus as set forth in claim 6, wherein the means for cooling the refrigerant comprises a chamber provided in the housing within which carbon dioxide can be confined, together with a temperature-responsive valve means for releasing from the chamber the gas under pressure built up by the sublimation of said carbon dioxide to produce a cooling effect to thereby cool the refrigerant circulating through the coils.

8. A refrigerating unit for a well survey instrument assembly, which unit includes, a housing having a pressure chamber therein for containing a solidified gas compound, a release valve for controlling the escape of the gas under pressure from the chamber which gas under pressure is caused by the sublimation of the compound from within the chamber, said housing also having an expansion chamber into which the pressure escapes when the release valve is opened, a cooling coil associated with the expansion chamber and having a liquid refrigerant therein, said refrigerant being cooled by the cooling effect resulting from the released gas pressure when the control valve is opened, and means for connecting the housing to the survey instrument assembly whereby the cooled refrigerant within the cooling coil functions to cool the survey instrument assembly.

9. A refrigerating apparatus as set forth in claim 8, together with means in the expansion chamber for absorbing the gas admitted to said chamber.

10. A refrigerating apparatus as set forth in claim 8, wherein the solidified gas compound is carbon dioxide, together with an absorbing compound within the expansion chamber capable of absorbing the carbon dioxide released into said expansion chamber.

GORDON JACKSON.

REFERENCES CITED

The following references are of record in the file of this patent:

UNITED STATES PATENTS

| Number | Name | Date |
|---|---|---|
| 1,870,696 | Taylor | Aug. 9, 1932 |
| 2,000,524 | Kothny | May 7, 1935 |
| 2,033,561 | Wells | Mar. 10, 1936 |
| 2,287,492 | Brown | June 23, 1942 |
| 2,324,103 | Miller | July 13, 1943 |